> United States Patent [19]

Coady et al.

[11] Patent Number: 4,992,524
[45] Date of Patent: Feb. 12, 1991

[54] COMPOSITION FOR OPTICAL FIBER COATING COMPRISING A POLYETHER DIOL, A POLYISOCYANATE, AND A METHACRYLATE

[75] Inventors: Clive J. Coady, Des Plaines; Donald W. Fieder, Palatine, both of Ill.; Kazuaki Okabe; Katsutoshi Igarashi, both of Yokohama; Yoshio Matsumura, Yamato, all of Japan

[73] Assignees: Japan Synthetic Rubber Co., Ltd.; Hodogaya Chemical Co., Ltd., both of Japan; DeSoto, Inc., Naperville, Ill.

[21] Appl. No.: 471,661

[22] Filed: Jan. 23, 1990

Related U.S. Application Data

[63] Continuation of Ser. No. 223,098, Jul. 22, 1988, abandoned.

[30] Foreign Application Priority Data

Oct. 20, 1987 [JP] Japan ................ 62-265197

[51] Int. Cl.⁵ ................ C08G 18/67; C08G 18/66
[52] U.S. Cl. ................ 528/49; 528/75
[58] Field of Search ................ 528/49, 75

[56] References Cited

U.S. PATENT DOCUMENTS

| | | | |
|---|---|---|---|
| 4,133,723 | 1/1979 | Howard | 204/15 |
| 4,139,567 | 2/1979 | Pruckmayr | 568/613 |
| 4,195,149 | 3/1980 | Stutz et al. | 528/49 |
| 4,246,391 | 1/1981 | Watson, Jr. | 528/49 |
| 4,568,775 | 2/1986 | Aoshima et al. | 568/617 |
| 4,581,407 | 4/1986 | Schmid | 524/548 |
| 4,590,285 | 5/1986 | Ernst | 549/509 |
| 4,683,280 | 7/1987 | Ukachi et al. | 528/71 |

*Primary Examiner*—Morton Foelak
*Assistant Examiner*—Dennis R. Daley
*Attorney, Agent, or Firm*—Dressler, Goldsmith, Shore, Sutker & Milnamow, Ltd.

[57] ABSTRACT

A radiation-curable coating composition adapted for the coating of optical glass fiber, comprising an ethylenically unsaturated polyurethane which is the reaction product of:

(A) a polyether diol having a molecular weight in the range of 200 to 8,000 and a structural unit represented by the formula:

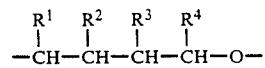

in which $R^1$-$R^4$ are each independently selected from hydrogen and an alkyl group containing from 1-4 carbon atoms, such as a polymer of copolymer of methyl tetrahydrofuran;

(B) a polyisocyanate compound, preferably a diisocyanate; and (C) a polymerizable ethylenically unsaturated compound having a single hydroxy group, such as a monohydric acrylate;

there being employed per equivalent of hydroxy in component (C) from 1.1 to 2 equivalents of said polyisocyanate with the balance of the isocyanate groups being reacted waith the hydroxy groups of said diol.

17 Claims, No Drawings

COMPOSITION FOR OPTICAL FIBER COATING COMPRISING A POLYETHER DIOL, A POLYISOCYANATE, AND A METHACRYLATE

This application is a continuation of application Ser. No. 223,098, filed Jul. 22, 1988, now abandoned.

DESCRIPTION

Technical Field

This invention relates to compositions which are curable in various ways, but preferably with ultraviolet radiation, to provide coatings for optical glass fiber where one needs a low viscosity coating which will cure rapidly to provide good water resistance in a film which a small variation in physical characteristics over a wide range of temperature.

DESCRIPTION OF THE INVENTION

The present invention relates to a radiation-curable coating composition which combines diverse characteristics in order to maximize the effectiveness of the cured coating to protect the optical glass fiber upon which it is applied. In some instances the cured characteristics are markedly enhanced. In other instances, the reduced crystallinity of the coating compositions greatly reduces the viscosity of the composition which is applied to the fiber, which speeds the application process.

It will be understood that one can always lower the viscosity of a radiation-curable coating composition by increasing the proportion of low viscosity monoethylenic monomer which is present, but this is not a viable solution to the problem, for the greater the proportion of monoethylenic monomer or other low viscosity liquid with is present, the poorer the properties of the cured coating.

PRIOR ART

An optical fiber usually has a diameter of less than 200 micrometers, and is made from a fragile or brittle material. Thus, an optical fiber is readily damaged or broken. In the manufacture of an optical fiber, it is therefore customary to apply a resin coating immediately after thermal melt spinning of glass fiber for protecting or reinforcing it.

Following characteristics are required for the coating material of an optical fiber:

(1) A high curing speed and a high productivity,
(2) A good flexibility.
(3) A small variation in the properties due to temperature changes of over a wide range.
(4) Excellent thermal resistance and hydrolysis resistance.
(5) A small variation in properties on use over a long period of time, i.e., reliability in respect of long-term use.
(6) Excellent resistance to chemicals such as acids and alkalis.
(7) A low moisture or water absorptivity.
(8) It must be liquid at normal temperatures and must possess a good processability.

Thermally curable silicone resins have been used as a material for optical fiber coating. But, these materials can be cured only slowly, and no improvement in the productivity can be expected by using them. In recent years, radiation (active energy rays)-curable coating materials have been developed, which is to replace thermally curable silicone resins.

Radiation-curable coating materials generally comprises a relatively viscous polymer with a molecular weight of several thousands, to which a radiation-curable monomer is compounded. As polymers with a molecular weight of several thousands, there are known those containing urethane (meth)acrylate using a polyether type homopolymer such as polyethylene glycol, polypropylene glycol, polytetramethylene glycol, and the like. But, these coating compositions containing urethane (meth)acrylate using a polyether type homopolymer have following drawbacks. That is; when polyethylene glycol is used the composition has an unacceptably high moisture absorptivity, when polypropylene glycol is used it has only poor thermal resistance and hydrolysis resistance in addition to high moisture absorptivity, and when polytetramethylene glycol is used the composition has relatively good characteristics, but tends to solidify at a room temperature due to its crystalline property, thus providing only a deficient productivity. Moreover, this composition using polytetramethylene glycol has a high viscosity which requires use of a large amount of a radiation-curable monomer. This causes the composition only inadequately curable.

In order to improve these drawbacks in coating compositions containing urethane (meth)acrylate using polyether type homopolymer, coating compositions containing urethane (meth)acrylate using a polyether type copolymer has been proposed. These coating compositions contain urethane/(meth)acrylate using a ring-opened copolymer of tetrahydrofuran-ethylene oxide (Japanese Patent Laid-open No. 86450/1986), or a ring-opened copolymer of tetrahydrofuran-propylene oxide (Japanese Patent Laid-open No. 181170/1985).

[Problems Sought to be Solved by the Invention]

The compositions containing these polyether type copolymer have problems still to be resolved. That is, when a ring-opened copolymer of tetrahydrofuran-ethylene oxide is used, the composition has problems in respect of moisture absorptivity, thermal resistance, and hot-water resistance. On the other hand, the composition using a ring-opened copolymer of tetrahydrofuran-propylene oxide has problems in respect of thermal resistance and hot-water resistance. Thus, both compositions are not yet satisfactory with respect to reliability in the prolonged use.

Therefore, any known materials for coating an optical fiber do not satisfy the above-mentioned characteristics which are required for such materials.

[Means for the Solution of the Problems]

Accordingly an object of this invention is to provide a composition for optical fiber coating comprising as a component thereof a urethane/(meth)acrylate polymer which is prepared by reacting the following compounds:

(A) a polyol compound comprising a structural unit represented by the following formula (I):

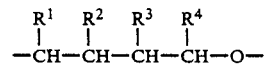

in which $R^1$–$R^4$ each independently represents a hydrogen atom or an alkyl group having 1–4 carbon atoms, with a proviso that at least one of them is an alkyl group, (B) a polyisocyanate compound, and (C) a (meth)acrylate compound containing a hydroxyl group.

It is essential for the polyol type compound (A) has a structural unit represented by the formula (I). Examples of preferred groups include such groups as:

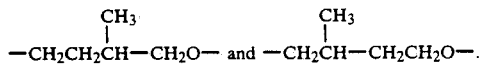

The polyol type compound (A) to be used in this invention may contain any other structural units so long as the compound has at least the structural unit represented by the formula (I). Such other structural unit may include, for example such groups as:

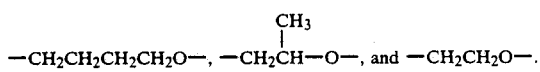

Following compounds are given as preferred examples of the polyol compound (A): compounds prepared by polymerizing at least one compound selected from 2-alkyl-1,4-butanediol and 3-alkyl-1,4-butanediol; compounds prepared by ring-opening polymerization of 2-alkyl-tetrahydrofuran or 3-alkyl-tetrahydrofuran; and compounds prepared by copolymerization of 2-alkyl-tetrahydrofuran, 3-alkyl-tetrahydrofuran or 2-alkyl-1,4-butanediol, and a cyclic ether such as ethylene oxide, propylene oxide and tetrahydrofuran. When the polyol type compound (A) includes a structural unit other than the structural unit represented by the formula (I), it is desirable that the latter unit represented by the formula (I) is contained in at least 5% by weight, preferably at least 10% by weight in the compound.

As a compound constituting the urethane/(meth)acrylate polymer according to this invention, a polyol compound not possessing the structural unit represented by the formula (I) may be used together with the polyol compound (A) having such structural unit.

Examples of such polyol compound not possessing the structural unit represented by the formula (I) include ethylene glycol, polyethylene glycol, propylene glycol, polypropylene glycol, tetramethylene glycol, polytetramethylene glycol, polybutadiene with a terminal hydroxyl group, hydrogenated polybutadiene with a terminal hydroxyl group, 1,6-hexanediol, neopentyl glycol, 1,4-cyclohexane dimethanol, bisphenol A, bisphenol F, alkylene oxide adducts of bisphenol A, alkylene oxide adducts of bisphenol F, dimethylolized compound of dicyclopentadiene, polyester diols, polycaprolactone diols, polycarbonate diols, and the like. A preferable molecular weight of these polyol compounds is in the range of from 200 to 8,000.

The polyol compound not possessing the group represented by the formula (I) as a structural unit can be used usually in an amount of less than 800 parts by weight per 100 parts by weight of the polyol compound (A).

Polymerization reaction for preparing the polyol (A) compound is carried out in the presence of a cationic polymerization catalyst comprising a strong acid such as fluorosulfonic acid, chlorosulfonic acid, and perchloric acid, or solid acid such as acid clay, and heteropoly acid, or the like.

The molecular weight of the polyol compound (A) is usually in the range of from 200 to 8,000, with the particularly preferable range being from 400 to 5,000. When the molecular weight is less than 200, a flexible coat can not be obtained. On the other hand, if it is more than 8,000, workability on the occasion of coating the composition on an optical fiber is impaired due to its high viscosity.

A polyisocyanate compound (B) used in the present invention includes, for example, polyisocyanates of 2,4-tolylenediisocyanate, 2,6-tolylenediisocyanate, 1,3-xylenediisocyanate, 1,4-xylenediisocyanate, 1,5-naphthalenediisocynate, m-phenylenediisocyanate, p-phenylenediisocyanate, 3,3'-dimethyl-4,4'-diphenylmethanediisocyanate, 4,4'-diphenylmethanediisocyanate, 3,3'-dimethylphenylenediisocyanate, 4,4'-biphenylenediisocyanate, 1,6-hexamethylenediisocyanate, isophoronediisocyanate, methylenebis(4-cyclohexylisocyanate), 2,2,4-trimethylhexamethylenediisocyanate, 2,4,4-trimethylhexamethylenediisocyanate, 1,4-hexamethylenediisocyanate, bis(2-isocyanateethyl) fumarate, 6-isopropyl-1,3-phenyldiisocyanate, 4-diphenylpropaneisocyanate, lysinediisocyanate, and the like. Among them preferred polyisocyanates are 2,4-tolylenediisocyanate, 2,6-tolylenediisocyanate, isophoronediisocyanate, and the like. These polyisocyanates may be used independently or two or more of them may be used in combination.

(Meth)acrylate compounds (C) having a hydroxyl group include 2-hydroxyethyl (meth)acrylate, 2-hydroxypropyl (meth)acrylate, 2-hydroxy-3-phenyloxypropyl (meth)acrylate, propanediol (meth)acrylate, 1,4-butanediol mono(meth)acrylate, 2-hydroxyalkyl(meth)acryloyl phosphate, 4-hydroxycyclohexyl (meth)acrylate, 1,6-hexanediol mono(meth)acrylate, neopentyl glycol mono(meth)acrylate, trimethylolpropane di(meth)acrylate, trimethylolethane di(meth)acrylate, pentaerythritol tri(meth)acrylate, dipentaerythritol penta(meth)acrylate, and (meth)acrylates represented by the following formula (II) or (III):

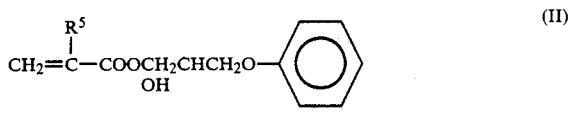

in which $R^5$ represents a hydrogen atom or a methyl group and n denotes an integer of from 1 to 15. In addition, compounds obtained by addition reaction of a glycidyl group-containing compound such as alkyl glycidylether, aryl glycidylether and glycidyl(meth)acrylate with (meth)acrylic acid may be used. Preferred (meth)acrylate compounds among from the above-mentioned compounds are 2-hydroxyethyl (meth)acrylate, 2-hydroxypropyl (meth)acrylate, and the like.

The urethane/(meth)acrylate polymer used in this invention can be prepared by reacting the above-mentioned polyol compound (A), polyisocyanate compound (B), and (meth)acrylate compound (C) containing a hydroxyl group. More specifically, it can be prepared by reacting the isocyanate group of said polyisocyanate compound (B) with the hydroxyl group of said polyol compound (A) and (meth)acrylate compound (C) containing a hydroxyl group.

This reaction can be carried out by charging polyol compound (A), polyisocyanate compound (B), and (meth)acrylate compound (C) altogether. Alternatively, it can be carried out by first reacting polyol compound (A) and polyisocyanate compound (B), and then reacting the resulting compound with (meth)acrylate compound (C) having a hydroxyl group. More specifically, this latter method comprises the reaction of hydroxyl group of polyol compound (A) with isocyanate group of polyisocyanate compound (B) under conditions such that an excessive amount of isocyanate group may be present in relation to hydroxyl group in the reaction system, and then reacting the remaining isocyanate group with hydroxyl group of (meth)acylate compound (C). Furthermore, preparation of the polymer may also be performed by first reacting polyisocyanate compound (B) with (meth)acrylate compound (C), and then reacting polyol compound (A) with the resulting product, i.e. by reacting hydroxyl group of (meth)acrylate compound (C) with isocyanate group of polyisocyanate compound (B) under conditions such that an excessive amount of isocyanate group may be present in relation to hydroxyl group in the reaction system, and then reacting the remaining isocyanate group with hydroxyl group of polyol compound (A).

The proportion of the polyol compound (A), polyisocyanate compound (B) and (meth)acylate compound (C) to be used is desirably determined such that the isocyanate group contained in the polyisocyanate compound (B) and the hydroxyl group contained in the (meth)acylate compound (C) may be from 1.1 to 2 equivalent and from 0.5 to 1.5 equivalent, respectively, per 1 equivalent of the hydroxyl group contained in the polyol compound (A).

A urethanization catalyst such as copper naphthenate, cobalt naphthenate, zinc naphthenate, n-butyltin laurate, triethylamine, and the like is usually used in the above reaction in an amount of from 0.01 to 1.0 part by weight per 100 parts by weight of the total amount of the raw materials. The reaction temperature is in the range of between 10° and 90° C., with particularly preferable range being between 30° and 80° C.

The urethane/(meth)acrylate polymer thus prepared, which is a component of the composition according to the present invention, is compounded in said composition desirably in the proportion of from 5 to 100 parts by weight. But, in order to afford flexibility to the cured material after the composition has been coated on an optical fiber, and also in order to keep the reliability of the product over a long period of time, it is desirable that the polymer be compounded to the composition in the proportion of from 10 to 100 parts by weight.

To the extent that the characteristics required for the composition of the present invention are not impaired, the composition is compounded with radiation-curable polymers other than the urethane/(meth)acrylate polymer, as well as reactive diluents and other additives.

Radiation-curable polymers other than the urethane/(meth)acrylate polymer to be compounded with the composition of this invention include, for example, urethane/(meth)acrylates other than the above urethane/(meth)acrylate, polyester (meth)acrylates, epoxy (meth)acrylates, polyamide (meth)acrylates, diene type polymers containing (meth)acryloyloxy group, siloxane polymers containing (meth)acryloyloxy group, and the like. One or more than two of these polymers may be compounded to the composition of this invention.

The reactive diluents include the following compounds: 2-hydroxyethyl (meth)acrylate, 2-hydroxypropyl (meth)acrylate, butyl (meth)acrylate, 2-ethylhexyl (meth)acrylate, butoxyethyl (meth)acrylate, lauryl (meth)acrylate, tetrahydrofurfuryl (meth)acrylate, decyl (meth)acrylate, stearyl (meth)acrylate, n-hexyl (meth)acrylate, cyclohexyl (meth)acrylate, isobornyl (meth)acrylate, methoxyethyl (meth)acrylate, ethoxyethyl (meth)acrylate, butoxyethyl (meth)acrylate, phenoxyethyl (meth)acrylate, dicyclopentenyl (meth)acrylate, diethylene glycol (meth)acrylate, ethoxydiethylene glycol (meth)acrylate, benzyl (meth)acrylate, polyethylene glycol (meth)acrylate, polypropylene glycol (meth)acrylate, methoxypolyethylene glycol (meth)acrylate, methoxypolypropylene glycol (meth)acrylate, phenoxypolyethylene glycol (meth)acrylate, alkylphenoxyethyl (meth)acrylate, alkylphenoxypolyalkylene glycol (meth)acrylate, 2-hydroxy-3-phenyloxypropyl (meth)acrylate, tetrahydrofurfryloxypolyalkylene glycol (meth)acrylate, dicyclopentenyloxypolyalkylene glycol (meth)acrylate, 2-hydroxyalkyl(meth)acryloyl phosphate, polyfluoroalkyl (meth)acrylate, N-vinyl pyrrolidone, N-vinyl caprolactam, diacetone (meth)acrylamide, isobutoxymethyl (meth)acrylamide, N,N-dimethyl acrylamide, t-octyl (meth)acrylamide, dialkylaminoethyl (meth)acrylate, (meth)acryloylmorphorine, vinyl acetate, vinyl propionate, ethylene glycol di(meth)acrylate, propanediol di(meth)acrylate, 1,4-butanediol di(meth)acrylate, trimethylolpropane di(meth)acrylate, neopentyl glycol di(meth)acrylate, 1,5-hexanediol di(meth)acrylate, polyethylene glycol di(meth)acrylate, polypropylene glycol di(meth)acrylate, hydroxypivalic acid neopentyl glycol ester di(meth)acrylate, trimethylolpropane tri(meth)acrylate, trimethylolpropanetrioxyethyl (meth)acrylate, tricyclodecanedimethanol di(meth)acrylate, dicyclopentadiene di(meth)acrylate, pentaerythritol tri(meth)acrylate, pentaerythritol tetra(meth)acrylate, (meth)acrylate of bisphenol A-ethylene oxide adduct, carbamoiloxyalkyl (meth)acrylate, and the like. One or more than two kinds of these compounds may be compounded to the composition of this invention.

Other additives include various kinds of polymers and oligomers such as epoxy resin, polyamide, polyamideimide, polyurethane, polybutadiene, chloroprene, polyether, polyester, pentadiene derivatives, styrene/butadiene/styrene block copolymer, styrene/isoprene/styrene block copolymer, petroleum resin, xylene resin, ketone resin, fluoro-resin oligomer, silicone resin oligomer, polysulfide type oligomer, and the like. In addition, such additives as an antioxidant, coloring agent, ultraviolet absorber, silane coupling agent, thermal polymerization inhibitor, leveling agent, preservative, plastisizer, lubricant, solvent, filler, aging inhibitor, wetting improver, coated surface improver, and the like may be added as required.

The composition of this invention can be thermally- and/or radiation-cured. In this invention, "radiation" means such ionizing radiations as X-rays, electron rays, $\alpha$-rays, $\beta$-rays, and $\gamma$-rays.

When the composition of this invention is thermally hardened, a radical polymerization initiator commonly used is employed. Such a radical polymerization initiator includes, for example, peroxides such as benzoyl peroxide and di-t-butyl peroxide, and azobisisobutylonitril and the like. The amount to be added may be in the range of from 0.1 to 10 parts by weight per 100 parts by weight of the composition of the present invention.

When the composition of this invention is hardened by ultraviolet rays, it is desirable to add a photopolymerization initiator and, in addition if required, a photosensitizer to the composition. Enumerated as examples of photo-polymerization initiators are benzophenone, benzoin, benzoinisobutyl ether, benzil, benzoinethyl ether, 2,2-dimethoxy-2-phenylacetophenone, xanthone, fluorenone, 4-chlorobenzophenone, triphenylamine, carbazole, 3-methylacetophenone, 4,4'-dimethoxybenzophenone, 4-4'-diaminobenzophenone, Michler's ketone, benzoin propyl ether, acetophenone diethyl ketal, benzoin ethyl ether, 1-hydroxycyclohexylphenyl ketone, 4'-isopropyl-2-hydroxy-2-methyl-propiophenone, α, α-dichloro-4-phenoxyacetophenone, benzyl dimethyl ketal, 2,2-diethoxyacetophenone, chlorothioxantone, 2-isopropylthioxantone, diethylthioxantone, 3,3-dimethyl-4-methoxybenzophenone, 2-methyl-1-[4-(methylthio)phenyl]-2-morphorinopropanon, α-hydroxycyclohexylphenyl ketone, Ubecryl P36 (high molecular weight benzophenone manufactured by UCB Co.), 2,4,6-trimethylbenzoyldiphenylphosphine oxide, and the like. Photo-sensitizers include amines, ureas, phosphorus compounds, sulfur compounds, nitrils, and the like. Specific examples of particularly preferred photo-sensitizers are triethylamine, diethylaminoethyl methacrylate, N-methyldiethanolamine, 4-dimethylaminoethyl benzoate, 4-dimethylaminoisoamyl benzoate, 4,4'-bisdiethylaminobenzophenone, Ubecryl P104 (a high molecular tertiary amine compound manufactured by UCB Co.), and the like. These photopolymerization initiators and photo-sensitizers are used independently or in combination with one or more others. The total amount of the pohopolymerization initiator and photo-sensitizer is in the range of from 0.01 to 10 parts by weight, preferably from 0.05 to 8 parts by weight, per 100 parts by weight of the composition of this invention.

When the composition of this invention is cured using both heat and ultraviolet rays, both of the above radical polymerization initiators and photo-sensitizers are employed in combination.

When the composition of this invention is cured using ionizing radiations, there is no special need for the photopolymerization initiator to be added to the composition as it can rapidly cure without the polymerization initiator.

The composition of the present invention usually has a viscosity ranging from 2,000 to 12,000 cps at 25° C. It is usually hardened at a temperature of the range of between 10° and 200° C. There is no specific restriction as to the atmosphere in which the composition is hardened, but an inert gas atmosphere of such as nitrogen or argon, or an atmosphere with a reduced oxygen content is desirable.

EXAMPLES

The invention is hereinafter further illustrated by way of examples, which shall, however, by mo means be construed as limiting the scope of this invention.

EXAMPLE 1

(1) A reaction vessel was charged with 444 g of isophoronediisocyanate, 1 g of dibutyltin laurate and 0.1 g of 2,6-di-t-butyl-4-methylphenol. To the mixture added was 3,000 g of polyether diol which is a 80/20 (by weight) copolymer of tetrahydrofuran and 3-methyltetrahydrofuran having a number average molecular weight of 3,000 [hereinafter referred to as "polyether diol (1)"] in 2 hours, while stirring and controlling the internal temperature at 50°-60° C.

After completion of the addition of the polyether diol (1), the stirring was continued for about 1 hour while maintaining the internal temperature at 50°-60° C. Thereafter, 232 g of 2-hydroxyethyl acrylate was added in 1 hour at 50°-60° C., whereupon the stirring was further continued for 3 hours while maintaining the internal temperature at 50°-60° C. to obtain a polymer, which is hereinafter referred to as "polymer A".

(2) A liquid curable resin composition with a viscosity of 8,500 cps at 25° C. was prepared by mixing 65 g of polymer A, 20 g of polyethylene glycol monononylphenylether acrylate, 12 g of tetrahydrofurfuryl acrylate and 3 g of acetophenone diethyl ketal.

EXAMPLE 2

(1) A reaction vessel was charged with 522 g of 2,4-toluenediisocyanate, 1 g of dibutyltin laurate, 0.1 g of 2,6-di-t-butyl-4-methylphenol, and 528 g of phenoxyethyl acrylate. To the mixture added was 232 g of 2-hydroxyethyl acrylate in 2 hours, while stirring and controlling the internal temperature at 5°-20° C.

After completion of the addition of 2-hydroxyethyl acrylate, the stirring was continued for about 1 hour while maintaining the internal temperature at 10°-20° C. Thereafter, 4,000 g of polyether diol prepared by ring-opening polymerization of 3-methyltetrahydrofuran with a number average molecular weight of 2,000 [hereinafter referred to as "polyether diol (2)"] was added in 1 hour at 20°-40° C, whereupon the stirring was further continued for 3 hours while maintaining the internal temperature at 50°-60° C. to obtain a mixture of phenoxyethyl acrylate and a polymer at a ratio by weight of 9:1. The mixture is hereinafter referred to as "polymer B".

(2) A liquid curable resin composition with a viscosity of 10,000 cps at 25° C. was prepared by mixing 72 g of polymer B, 20 g of polyethylene glycol monoacrylate (an average molecular weight: 300), 5 g of vinyl pyrrolidone and 3 g of acetophenone diethyl ketal.

EXAMPLE 3

(1) A reaction vessel was charged with 522 g of 2,4-toluenediisocyanate, 1 g of dibutyltin laurate, 0.1 g of 2,6-di-t-butyl-4-methylphenol, and 717 g of phenoxyethyl acrylate. To the mixture added was 232 g of 2-hydroxyethyl acrylate in 2 hours, while stirring and controlling the internal temperature at 5°-20° C.

After completion of the addition of 2-hydroxyethyl acrylate, the stirring was continued for about 1 hour while maintaining the internal temperature at 10°-20° C. Thereafter, 5,100 g of polyether diol (1) and 600 g of polypropylene glycol with a number average molecular weight of 2,000 was added in 1 hour at 20°-40° C., whereupon the stirring was further continued for 3 hours while maintaining the internal temperature at 50°-60° C. to obtain a mixture of phenoxyethyl acrylate and a polymer at a ratio by weight of 9:1. The mixture is hereinafter referred to as "polymer C".

(2) A liquid curable resin composition with a viscosity of 7,000 cps at 25° C. was prepared by mixing 67 g of polymer C, 20 g of Aronix M113, 10 g of tetrahydrofrufryl acrylate, and 3 g of acetophenone diethyl ketal.

EXAMPLE 4

(1) A reaction vessel was charged with 444 g of isophoronediisocyanate, 1 g of dibutyltin laurate and 0.1 g of 2,6-di-t-butyl-4-methylphenol. To the mixture added was 2,000 g of polyether diol obtained by ring-opening copolymerization of tetrahydrofuran and 3-methyltetrahydrofuran at a weight ratio of 60/40, and having a number average molecular weight of 2,000 [hereinafter referred to as "polyether diol (3)"] in 2 hours, while stirring and controlling the internal temperature at 50°-60° C.

After completion of the addition of polyether diol (3), the stirring was continued for about 1 hour while maintaining the internal temperature at 50°-60° C. Thereafter, 232 g of 2-hydroxyethyl acrylate was added in 1 hour at 50°-60° C., whereupon the stirring was further continued for 3 hours while maintaining the internal temperature at 50°-60° C. to obtain a polymer, which is hereinafter referred to as "polymer D".

(2) A liquid curable resin composition with a viscosity of 9,600 cps at 25° C. was prepared by mixing 50 g of polymer D, 22 g of pentaerythritol acrylate, 20 g of isobornyl acrylate, 5 g of vinyl pyrrolidone and 3 g of acetophenone diethyl ketal.

COMPARATIVE EXAMPLE 1

A polymer was prepared in the same manner as in Example 1-(1), except that 3,000 g of polytetramethylene glycol with a number average molecular weight of 3,000 was used instead of 3,000 g of polyether diol (1). Then, following the same manner as in Example 1 - (2), but for using this polymer instead of polymer (A), a liquid curable resin composition with a viscosity of 21,000 cps at 25° C. was prepared.

COMPARATIVE EXAMPLE 2

A polymer was prepared in the same manner as in Example 1-(1), except that 3,000 g of polyether diol obtained by ring-opening copolymerization of tetrahydrofuran and propylene oxide at a ratio by weight of 80/20, and having a number average molecular weight of 3,000, was used instead of 3,000 g of polyether diol (1). Then, following the same manner as in Example 1 - (2), but for using this polymer instead of polymer (A), a liquid curable resin composition with a viscosity of 8,200 cps at 25° C. was prepared.

COMPARATIVE EXAMPLE 3

A polymer was prepared in the same manner as in Example 1-(1), except that 3,000 g of polyether diol obtained by ring-opening copolymerization of tetrahydrofuran and ethylene oxide at a ratio by weight of 80/20 with a number average molecular weight of 3,000, was used instead of 3,000 g of polyether diol (1). Then, following the same manner as in Example 1 - (2), but for using this polymer instead of polymer (A), a liquid curable resin composition with a viscosity of 8,500 cps at 25° C. was prepared.

TEST EXAMPLES

Test specimens were prepared using liquid curable resin compositions prepared in the above Examples 1–4 and Comparative Examples 1–4 according to the following method to subject the same to various tests.

1. Preparation of test specimens

The composition was coated on a glass plate using an applicator with a 250 micron thickness. Ultraviolet rays of 1 J/cm$^2$ with a wave length of 350 nm were irradiated on the coated composition to obtain a cured film, which was then peeled apart from the glass plate. The film was conditioned for 24 hours at 23° C. and a relative humidity of 50% before submitting it to the tests.

2. Test Methods (1) Initial properties (Young's modulus, breaking elongation and breaking strength)

A tension tester was used for measuring Young's modulus at a pulling rate of 1 mm/min and a bench mark of 25 mm, and the breaking elongation and the breaking strength at a pulling rate of 50 mm/min and a bench mark of 25 mm on said test specimens at 23° C.

(2) Moisture absorption

The rate of the moisture absorption of said test specimen was measured conforming to JIS K7310.

(3) Thermal resistance and hot-water resistance.

Test specimens for the thermal resistance and hot-water resistance were prepared by leaving the above-mentioned test specimens in an oven at 80° C. and in hot-water at 80° C. for 3 months, respectively. The test specimens for the thermal resistance and hot-water resistance thus prepared were subjected to measurement of Young's modulus, breaking elongation, and breaking strength at 23° C. and according to the same manner as (1) above. Those specimens whose variations in the values of Young's modulus, breaking elongation, and breaking strength as against their initial values were within ±30% are designated as AAA (acceptable), and those exceeding ±30% are designated as BBB (not acceptable).

Effect of the Invention

The composition for an optical fiber coating according to the present invention, owing to its inclusion of a specific type of urethane/(meth)acrylate polymer, has a high curing speed, flexibility, a small property variation over a wide temperature range, and an excellent thermal resistance and hot-water resistance. In addition, it exhibits only a small changes in properties on use for a long period of time, thus providing a reliability on the prolonged use. It also has an excellent resistance against acids and alkalis, and a small moisture or water absorptivity. Since material is liquid at normal temperatures, it can provide an excellent processability or workability. Thus, the composition of this invention is an excellent material for use as optical fiber coating, especially as a primary coating material of an optical fiber.

TABLE 1

|  | Moisture Absorptivity (%) | Initial Properties | | | Thermal Resistance 1 month | Hot-water Resistance 1 month |
|---|---|---|---|---|---|---|
|  |  | Young's Modulus (Kg. mm$^{-2}$) | Breaking Elongation (%) | Breaking Strength (Kg.mm$^{-2}$) | | |
| Examples |  |  |  |  |  |  |
| 1 | 2.3 | 0.3 | 150 | 0.3 | AAA | AAA |
| 2 | 2.4 | 0.3 | 150 | 0.25 | AAA | AAA |
| 3 | 2.3 | 0.2 | 100 | 0.1 | AAA | AAA |

TABLE 1-continued

|  | Initial Properties | | | | |
| --- | --- | --- | --- | --- | --- |
|  | Moisture Absorptivity (%) | Young's Modulus (Kg. mm$^{-2}$) | Breaking Elongation (%) | Breaking Strength (Kg.mm$^{-2}$) | Thermal Resistance 1 month | Hot-water Resistance 1 month |
| 4 | 2.4 | 50 | 40 | 3.5 | AAA | AAA |
| Comparative Examples |  |  |  |  |  |  |
| 1 | 2.4 | 0.3 | 160 | 0.3 | AAA | AAA |
| 2 | 3.0 | 0.3 | 150 | 0.25 | BBB | BBB |
| 3 | 5.0 | 0.3 | 140 | 0.25 | BBB | BBB |

What is claimed is:

1. A radiation-curable coating composition adapted for the coating of optical glass fiber, comprising an ethylenically unsaturated polyurethane which is the reaction product of compounds comprising:

(A) a polyether diol having a molecular weight in the range of 200 to 8,000 and a structural unit represented by at least one of:

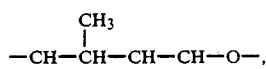

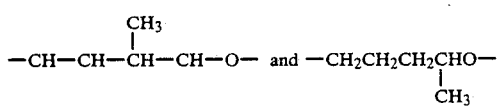

(B) a polyisocyanate compound; and
(C) a polymerizable (meth)acrylate having a single hydroxy group; there being employed per equivalent of hydroxy in component (A) from 1.1 to 2 equivalents of isocyanate groups in said polyisocyanate.

2. A coating composition as recited in claim 1 in which said polyisocyanate is a diisocyanate.

3. A coating composition as recited in claim 2 in which said polyether diol has a molecular weight of from 400 to 5,000.

4. A coating composition as recited in claim 1 that further comprises a second polyether diol having a structural unit different from the structural unit of said polyether diol (A).

5. A coating composition as recited in claim 1 in which said polyether diol is a polymer or copolymer of 3-methyltetrahydrofuran.

6. A coating composition as recited in claim 1 in which said polyether diol is a copolymer of 3-methyltetrahydrofuran with tetrahydrofuran.

7. A coating composition as recited in claim 3 in which said polyether diol is a polymer or copolymer of 3-methyltetrahydrofuran.

8. A coating composition as recited in claim 1 in which said component (C) is a monohydric acrylate.

9. A coating composition as recited in claim 3 in which said component (C) is a monohydric acrylate.

10. A coating composition as recited in claim 9 in which said component (C) is 2-hydroxyethyl acrylate.

11. A coating composition as recited in claim 1 in which said composition further includes a photopolymerization initiator rendering the composition curable with ultraviolet light.

12. A coating composition as recited in claim 9 in which said composition further includes a photopolymerization initiator rendering the composition curable with ultraviolet light.

13. A coating composition as recited in claim 1 wherein 0.5 to 1.5 equivalents of hydroxyl groups of (meth)acrylate (C) are utilized per equivalent of the hydroxyl group of diol (A).

14. A radiation-curable coating composition adapted for the coating of optical glass fiber, comprising an ethylenically unsaturated polyurethane that is the reaction product of compounds comprising:

(A) a polyether diol having a molecular weight in the range of 400 to 5,000 and a structural unit represented by at least one of:

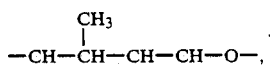

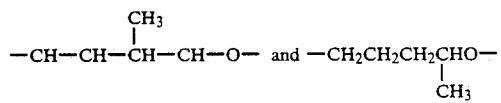

(B) a polyisocyanate compound; and
(C) a polymerizable (meth)acrylate having a single hydroxy group; there being employed per equivalent of hydroxy in component (A) from 1.1 to 2 equivalents of isocyanate groups in said polyisocyanate (B) and from 0.5 to 1.5 equivalents of hydroxyl groups of (meth)acrylate (C).

15. A composition as recited in claim 14 in which said polyisocyanate is a diisocyanate.

16. A composition as recited in claim 14 in which said polyether diol is selected from the group consisting of polymers and copolymers of a tetrahydrofuran and at least one of 2-methyltetrahydroforan and 3-methyltetrahydrofuran.

17. A composition as recited in claim 14 in which said (meth)acrylate is a monohydric acrylate.

* * * * *